United States Patent [19]
Dickey et al.

[11] Patent Number: 5,864,430
[45] Date of Patent: Jan. 26, 1999

[54] GAUSSIAN BEAM PROFILE SHAPING APPARATUS, METHOD THEREFOR AND EVALUATION THEREOF

[75] Inventors: Fred M. Dickey; Scott C. Holswade; Louis A. Romero, all of Albuquerque, N. Mex.

[73] Assignee: Sandia Corporation, Albuquerque, N. Mex.

[21] Appl. No.: 711,783

[22] Filed: Sep. 10, 1996

[51] Int. Cl.$^6$ .............................. G02B 27/46; H01S 3/10; B23K 26/00

[52] U.S. Cl. .......................... 359/559; 359/562; 359/162; 372/9; 219/121.69

[58] Field of Search ..................................... 359/559, 560, 359/561, 565, 568, 569, 571, 572; 382/280; 372/9, 20, 25; 219/121.68, 121.67, 121.69

[56] References Cited

U.S. PATENT DOCUMENTS

| | | |
|---|---|---|
| 3,848,104 | 11/1974 | Locke . |
| 4,138,190 | 2/1979 | Bryngdahl ................................. 359/15 |
| 4,475,027 | 10/1984 | Pressley . |
| 4,521,075 | 6/1985 | Obenschain et al. .................... 359/569 |
| 5,300,756 | 4/1994 | Cordingley . |
| 5,473,475 | 12/1995 | Sweatt et al. . |
| 5,627,847 | 5/1997 | Leger .......................................... 372/9 |

OTHER PUBLICATIONS

Handbook of Optics, vol. 1, Fundamentals, Techniques, and Design, Second Edition, Michael Bass, et al., 1995 pp. 30.4–30.9.

Kinoform Phase Plates for Focal Plane Irradiance Profile Control, Dixit, et al, Optics Letters, pp. 417–419 Mar. 15, 1994.

Transforming a Circular Laser Beam Into a Square or Trapezoid Almost, Sweatt, et al., Optical Engineering, Feb. 1992, vol. 31 No. 2, pp. 245–250.

Holographic Conversion of a Gaussian Beam to a Near–field Uniform Beam, Carl C. Aleksoff, et al. Optical Engineering, May 1991, vol. 30 No. 5, pp. 537–543.

Diffractive Optical Elements for Use in Infrared Systems, Swanson, et al., Optical Engineering , Jun. 1989, vol. 28, No. 6, pp. 605–608.

Multifaceted Laser Beam Integrators: General Formulation and Design Concepts, Fred M. Dickey, et al., Optical Engineering, Nov. 1988, vol. 27 No. 11, pp. 999–1007.

Laser Beam Profile Shaping With Interlaced Binary Diffraction Gratings, W. B. Veldkamp, Applied Optics, 1 Sep. 1992, vol. 21, No. 17, pp. 3209–3212.

Geometrical Transformations in Optics, Olof Bryngdahl, Journal of the Optical Society of America, vol. 64, No. 8, Aug. 1974, pp. 1092–1099.

Method For Converting A Gaussian Laser Beam Into a Uniform Beam, Wai–Hon Lee, Optics Communications, vol. 36, No. 6, Mar. 15, 1981, pp. 469–471.

*Primary Examiner*—Cassandra Spyrou
*Assistant Examiner*—Audrey Chang
*Attorney, Agent, or Firm*—V. Gerald Grafe

[57] ABSTRACT

A method and apparatus maps a Gaussian beam into a beam with a uniform irradiance profile by exploiting the Fourier transform properties of lenses. A phase element imparts a design phase onto an input beam and the output optical field from a lens is then the Fourier transform of the input beam and the phase function from the phase element. The phase element is selected in accordance with a dimensionless parameter which is dependent upon the radius of the incoming beam, the desired spot shape, the focal length of the lens and the wavelength of the input beam. This dimensionless parameter can also be used to evaluate the quality of a system. In order to control the radius of the incoming beam, optics such as a telescope can be employed. The size of the target spot and the focal length can be altered by exchanging the transform lens, but the dimensionless parameter will remain the same. The quality of the system, and hence the value of the dimensionless parameter, can be altered by exchanging the phase element. The dimensionless parameter provides design guidance, system evaluation, and indication as to how to improve a given system.

23 Claims, 9 Drawing Sheets

FIG. 16B

GAUSSIAN BEAM PROFILE SHAPING APPARATUS, METHOD THEREFOR AND EVALUATION THEREOF

GOVERNMENT RIGHTS

The United States Government has rights in this invention pursuant to Department of Energy Contract DE-AC04-94AL85000 with Sandia Corporation.

BACKGROUND OF THE INVENTION

The irradiance profile of a laser is typically Gaussian, i.e., the beam intensity in a plane normal to the beam is highest at the center or beam waist point and decreases as the distance from the center point increases. Such a distribution is not desirable for applications where the beam is to be uniformly applied to an area. Such applications include: material processing, e.g., welding, soldering; biomedical applications, e.g., laser surgery; illumination applications, e.g., semiconductor mask fabrication, optical data processing, optical computing; and research requiring uniform beams.

The simplest technique for modifying the irradiance profile is attenuation, where the beam is truncated spatially using a filter or an aperture. This technique suffers the obvious disadvantage of removing energy from the beam.

The multifaceted integrator approach to laser beam shaping is especially suitable to laser beams with highly irregular (multimode) irradiance distributions. The number and size of the facets are selected to accomplish the required integration or, equivalently, averaging. However, actual production of the required multifaceted mirror is difficult and expensive.

For single mode beams with a Gaussian profile, previous solutions have attempted to map the beam into a uniform intensity profile with steep skirts. This mapping consists of various techniques for associating the phase element with the phase of desired irradiance profile. One set of techniques is a geometrical and iterative in nature. As such, this set does not effective model the system, resulting in suboptimum design. Remaining approaches require assumption of target distribution without any criteria for which distributions are physically allowable. Again, these solutions are not optimal. None of the techniques offers any suggestions for improving, or even assessing, system performance.

SUMMARY OF THE INVENTION

The present invention maps a Gaussian laser beam into a beam with a uniform irradiance profile. The configuration analyzed exploits the Fourier transform properties of lenses. That is, the output optical field is the Fourier transform of the input optical field and a phase function. This configuration has the advantage of being able to change the output size or the working distance by changing the transform lens.

Additional objects, advantages and novel features of the invention will become apparent to those skilled in the art upon examination of the following description or can be learned by practice of the invention. The objects and advantages of the invention can be realized and attained by the instrumentalities and combinations particularly noted in the appended claims.

These and other objects of the present invention can be realized by providing a lens as a phase element in combination with a Fourier transform lens to provide a controlled irradiance profile for a laser beam. The phase element is selected in accordance with a dimensionless parameter related to the radius of the incoming beam, the desired spot size, the focal length of the lens and the wavelength of the beam.

In particular, these and other objects can be realized by providing an apparatus including a shaping element which induces a phase function on an input beam, a transform element which Fourier transforms the beam having the phase function induced thereon, and a target plane on which the beam having a desired shape is focused by the transform element The shaping element is selected in accordance with a parameter $\beta$ which is directly proportional to $r_0 y_0 / \lambda f$, where $r_0 = 1/e^2$ radius of the input beam, $y_0$ = scaling parameter of the desired shape, $\lambda$ = wavelength of the input beam, and $f$ = focal length of the transform element.

A telescope for controlling a size of the beam on the shaping element can be employed. The telescope can include the transform element. Preferably, the size of the beam output from the telescope matches an optimum beam size for the shaping element.

A phase plate can be positioned at the target plane, thereby allowing the beam output to have a uniform profile. A relay lens which compensates for the spreading of the beam by diffraction, can be used to further extend a depth of field of the apparatus. If the location of the target plane is simply to be moved, this relay lens alone can be used.

The shaping element can be positioned closer to the target plane than the transform element. The shaping element can then be positioned in a converging beam output by the transform element until a size of the beam on the shaping element reaches a design size, for achieving the desired shape.

The dimensionless parameter can be defined by the following equation:

$$\beta = \frac{2\sqrt{2\pi}\; r_0 y_0}{f \lambda}.$$

Preferably, the parameter $\beta > 3$.

These and other objects of the present invention can also be realized by providing a method for shaping a Gaussian beam including: inducing a phase function on an input beam via a shaping element, Fourier transforming the beam having the phase function induced thereon via a transform element onto a target plane on which the beam has a desired shape, and selecting the shaping element in accordance with a dimensionless parameter $\beta$ which is directly proportional to $r_0 y_0 / \lambda f$, where $r_0 = 1/e^2$ radius of the input beam, $y_0$ = scaling parameter of the desired shape, $\lambda$ = wavelength of the beam, and $f$ = focal length of the transform element.

The selecting can include selecting the focal length and the radius, while the wavelength and the scaling parameter are dictated by the intended application. The wavelength of the beam can be altered and the shaping element positioned in order to maintain the value of the dimensionless parameter $\beta$. The selecting step can include defining the parameter by the following equation:

$$\beta = \frac{2\sqrt{2\pi}\ r_0 y_0}{f\lambda}.$$

The selecting step can include choosing values such that the parameter β>3.

When the input beam is a circular Gaussian beam and the desired shape is a uniform beam with a rectangular cross-section, the selecting step further includes:

determining a normalized phase function ø(z) for a rectangular spot by:

$$\varphi(z) = \frac{\sqrt{\pi}}{2} \cdot z \cdot \text{erf}(z) + \frac{1}{2} \cdot \exp(-z^2) - \frac{1}{2},$$

where $$z = \frac{\sqrt{2} \cdot x}{r_0} \text{ or } z = \frac{\sqrt{2} \cdot y}{r_0},$$

where x=horizontal distance from axis of the shaping element,
y=vertical distance from axis of the shaping element,
$r_0 = 1/e^2$ radius of incoming Gaussian beam, and
erf(z)=error function; and multiplying the normalized phase function by the parameter β to determine the phase profile the shaping element imparts to the input beam.

When the input beam is a circular Gaussian beam and the desired shape is a uniform beam with a circular cross-section, the selecting step further includes:

determining a phase function ø(z) for a circular spot by:

$$\varphi(z) = \frac{\sqrt{\pi}}{2} \cdot \int_0^z \sqrt{1 - \exp(-\rho^2)}\ d\rho,$$

where $$z = \frac{\sqrt{2} \cdot r}{r_0},$$

and r=radial distance from axis of the shaping element, and
$r_0 = 1/e^2$ radius of incoming Gaussian beam; and multiplying the normalized phase function by the parameter β to determine the phase profile the shaping element imparts to the input beam.

The desired shape can one of a square, a rectangle, a circle, and an ellipse.

The transform element can be changed while maintaining the shaping element in order to alter a size of the desired shape. The shaping element can be changed while maintaining the transform element in order to alter system quality.

These and other objects of the present invention can be realized by providing a method for evaluating quality of a system for shaping a Gaussian beam including: determining a radius of an input beam, determining a half-width of a desired shape, determining a wavelength of the input beam, determining a focal length of a Fourier transform element in the system, and computing a parameter β which is directly proportional to $r_0 y_0 / \lambda f$, where $r_0 = 1/e^2$ radius of the input beam,
$y_0$=scaling parameter of the desired shape,
λ=wavelength of the beam, and
f=focal length of the transform element, wherein the greater the value of the parameter β, the better the quality of the system. The computing step can include defining the parameter by the following equation:

$$\beta = \frac{2\sqrt{2\pi}\ r_0 y_0}{f\lambda},$$

wherein β=3 indicates minimum desirable system quality.

Further scope of applicability of the present invention will become apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 4(a)–4(d) show profiles of square and circular spot geometries: FIG. 4(a) is a square profile, β=4; FIG. 4(b) is a square profile, β=8; FIG. 4(c) is a square profile, β=16.

FIG. 7(a) shows an element with positive phase function acts geometrically as an aberrated negative lens.

DETAILED DESCRIPTION OF THE PREFERRED EMBODIMENTS

THE ANALYTICAL SOLUTION

Figures 1, 2:
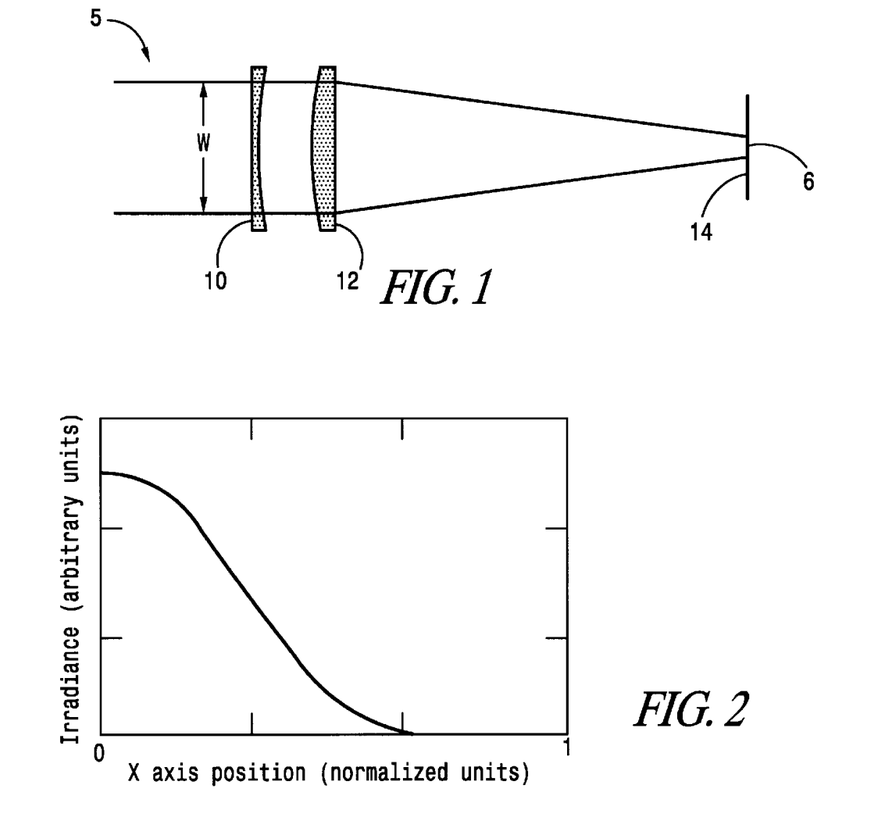
FIG. 1 is a Fourier transform beam shaping system of the present invention.
FIG. 2 shows a beam irradiance profile (right half) for the optimum solution of Eq. (2)

As can be seen in FIG. 1, a configuration of the present invention includes a phase or beam shaping element 10 in conjunction with a Fourier transform lens 12. The optical field at the focal plane of the transform lens 12 is proportional to the Fourier transform of the product of the input optical field and phase of the phase element 10. The configuration receives an input Gaussian beam 5, e.g., a laser beam, to be shaped. The desired beam profile is delivered at a target or output plane 14 at a target spot 6.

This configuration has several advantages. The phase element 10 can be replaced to control both the scale and shape of the output irradiance at the target plane 14. The transform lens 12 can be changed to change the working distance, i.e., the back focal length of the final lens, with a corresponding change in scale of the output. Finally, although the phase element 10 and transform lens 12 could be designed as a single integral optical element, it is generally easier to design and fabricate the two components if their functions are kept separate.

Given the configuration of FIG. 1, the problem is to design the phase element 10 used therein. The direct approach would be to solve for the phase function that minimizes the mean square difference between the desired irradiance and the irradiance produced by the phase element. In other words, the desired normalized phase function ø is the one that minimizes the following integral:

$$R = \int |\Im[(2/\sqrt{\pi})^{1/2} e^{-x^2} e^{i\phi}]|^2 - (1/\alpha)^{1/2} rect(f/\alpha)|^2 df, \quad (1)$$

where $\Im$ denotes a Fourier transform operation, $f$ denotes the corresponding frequency domain variable, $\alpha$ defines the size of the output, and the problem is scaled to a unit width $(1/e^2)$ Gaussian beam function. Here, the problem is formulated in one dimension x, which is appropriate to the separable problem of converting a circular Gaussian beam into a uniform beam with a square cross section. In general, a single variable will be used to represent a one or two dimensional variable. Unfortunately, a global solution to Eq. (1) is not available. However, a solution to a related problem of requiring both the amplitude and phase of the output to be constant over the region of interest and zero elsewhere is available.

The solution to the separable uniform amplitude and phase problem can be obtained by determining the phase ø that minimizes the functional $$R = \int |\Im[(2/\sqrt{\pi})^{1/2} e^{-x^2} e^{i\phi}] - (1/\alpha)^{1/2} rect(f/\alpha)|^2 df \quad (2)$$

$$= 2 - 2Re\int \Im[(2/\sqrt{\pi})^{1/2} e^{-x^2} e^{i\phi}](1/\alpha)^{1/2} rect(f/\alpha) df.$$

In Eq. (2), the input Gaussian function and the output rect function are normalized to unit energy. This insures that the mean square difference in Eq. (2) depends on the variation in the shape of the input and output functions, and not on any relative amplitude difference between the two functions. As a result, only the integral of the cross terms needs to be evaluated, since the normalization forces the other two integrals to unity.

The solution to Eq. (2) is readily obtained by applying Parseval's theorem and expanding the integrand. Integrating the magnitude squared terms gives $$R = 2 - 2Re\int (2\alpha/\sqrt{\pi})^{1/2} e^{-i\phi} sinc(\alpha x) e^{-x^2} dx. \quad (3)$$

Here, Re z denotes the real part of z. Clearly, R is minimized if the integral is maximized. This is obtained if ø is set equal to the phase of the sinc function. Since the phase of the sinc function is a binary function with values of 0 and π, the optimum phase function is a binary function.

All that remains is to determine the value of the integral that maximizes the integral in Eq. (3) with ø set equal to the phase of the sinc function. This can be evaluated numerically to give α=0.710. The beam profile irradiance for this solution is shown in FIG. 2, in which irradiance is plotted in arbitrary units, since only relative irradiance is of interest, and the corresponding X axis position is plotted in normalize units. This is just the optimum solution in accordance with Eq. (2). The solution shown in FIG. 2 is not as flat as might be expected. This is due to the fact that, with respect to Eq. (1), Eq. (2) is overly constrained. That is, in Eq. (2), both the phase and amplitude of the output are required to be uniform, whereas only the irradiance of the output in Eq. (1) is required to be uniform. It can also be noted that this solution corresponds to a value of R=1.199, which is a significant fraction of the maximum of R=2.

The solution to the problem of attaining uniform irradiance defined by FIG. 1. and Eq. (1) can be obtained by application of the method of stationary phase. In two dimensions, the general form of the equation to be solved is $$F(\omega_x, \omega_y) = \quad (4)$$

$$\frac{1}{2\pi} \int_{-\infty}^{\infty} \int_{-\infty}^{\infty} f(\xi, \eta) \exp(i(\beta\phi(\xi,\eta) - \xi\omega_x - \eta\omega_y)) d\xi d\eta,$$

where $\xi = x/r_{in}$, and $\eta = y/r_{in}$ are normalized input variables with $r_{in}$ defining the length scale, and $\omega_x = x_f/r_{out}$ and $\omega_y = y_f/r_{out}$ are normalized output variables at the focal plane of the Fourier transform with $r_{out}$ defining the length scale. The stationary phase solution improves asymptotically with increasing dimensionless parameter $\beta = 2\pi r_{in} R_0/f\lambda$, where $R_0$ is the radius of the output beam at the target plane, $\lambda$ is the optical wavelength of the beam and $f$ is the focal length of the transform lens.

The stationary phase evaluation of integrals of the type given by Eq. (4), generally, leads to second order partial differential equation for the phase function ø. The resulting partial differential equation can then be solved for ø, subject to an energy boundary condition determined by Parseval's theorem. The partial differential equation reduces to a second order ordinary differential equation for the separable and circularly symmetric problem. The optical element is then designed to realize the product βø, i.e., to impart the phase profile βø on the input beam.

The stationary phase evaluation of Eq. (4) allows for the mapping of arbitrary single mode laser beams into arbitrary irradiance profiles using the system in FIG. 1. However, some irradiance profiles can be more mathematically difficult to realize. For a circular Gaussian beam input, the problem of turning a Gaussian beam into a flat-top beam with rectangular cross section is separable. That is, the solution is the product of two one-dimensional solutions. β and ø(ξ) are thus calculated for each dimension. The phase element will then produce the sum of these phases ($\beta_x \phi_x(x) + \beta_y \phi_y(y)$) as a function of the horizontal distance x and the vertical distance y from the element axis. The corresponding one dimensional solution for ø is $$\phi(\xi) = \frac{\sqrt{\pi}}{2} \cdot \xi \cdot erf(\xi) + \frac{1}{2} \cdot \exp(-\xi^2) - \frac{1}{2}, \quad (5)$$

where $$\xi = \frac{\sqrt{2} \cdot x}{r_0} \text{ or } \xi = \frac{\sqrt{2} \cdot y}{r_0},$$

and x=horizontal distance from axis of phase element,
y=vertical distance from axis of phase element,
$r_0=1/e^2$ radius of incoming Gaussian beam (same as above).
$erf(\xi)$=error function, obtainable from math handbooks or math software.

Figure 6A:
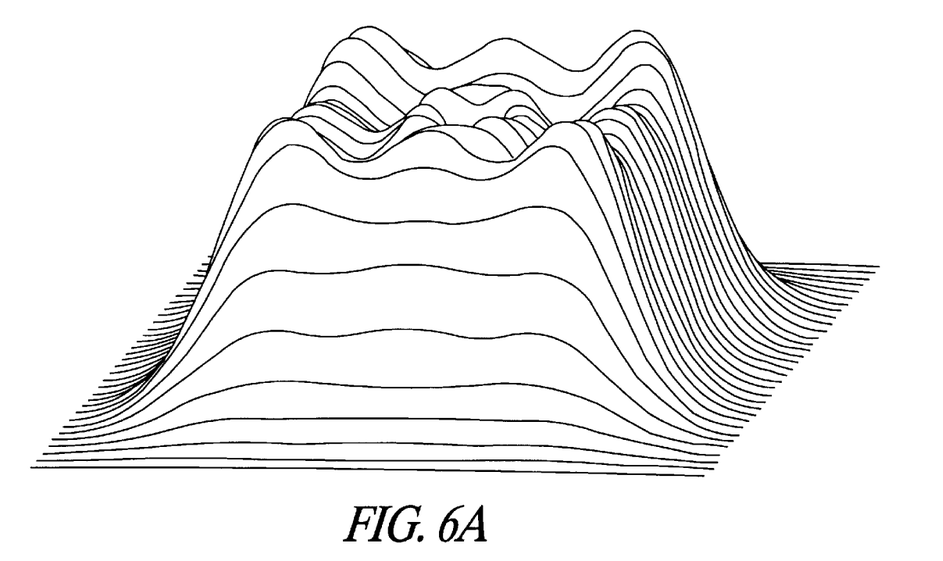
FIG. 6(a) shows a square target spot profile, β=8, apertures=1.5$r_0$.

An example of a square flat-top beam for $\beta=8$ is shown in FIG. 6(a).

Figure 6B:
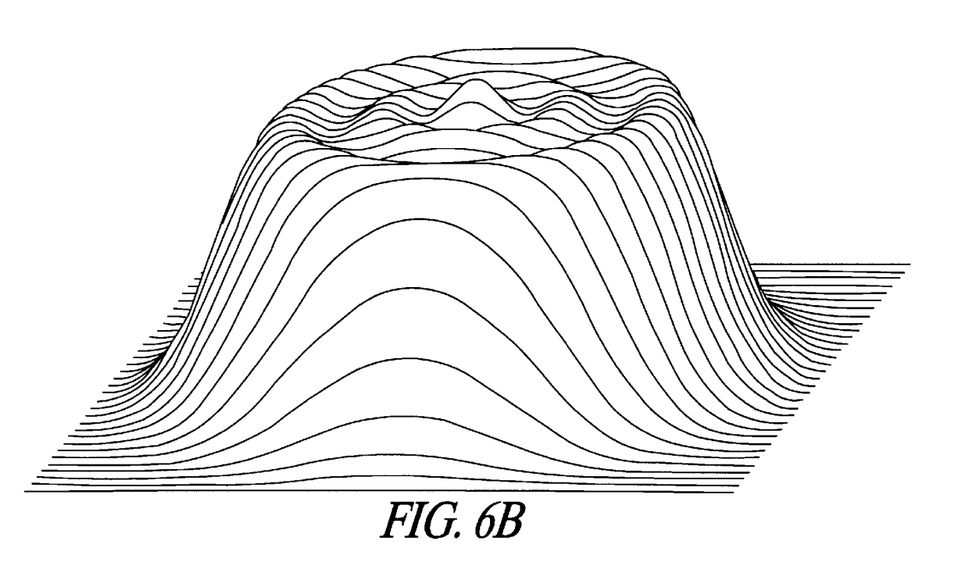
FIG. 6(b) shows a round target spot profile, β=8, apertures=2$r_0$.

The solution for the problem of turning a circular Gaussian beam into a flat-top beam with circular cross-section is:

$$\phi(z) = \frac{\sqrt{\pi}}{2} \cdot \int_0^z \sqrt{1 - \exp(-\rho^2)} \; d\rho, \quad (21)$$

where $$z = \frac{\sqrt{2} \cdot r}{r_0}, \quad (22)$$

and r=radial distance from axis of phase element,

The solution for the problem of turning a circular Gaussian beam into a flat-top beam with circular cross-section is $$\phi(\xi) = \frac{\sqrt{\pi}}{2} \cdot \int_0^\xi \sqrt{1 - \exp(-\rho^2)} \; d\rho, \quad (6)$$

where $$\xi = \frac{\sqrt{2} \cdot r}{r_0},$$

and r=radial distance from the optical axis, and
$r_0=1/e^2$ radius of incoming Gaussian beam (same as above).

ø(z) can be readily evaluated with the appropriate integration software. β is found as before, and the product of ø(z) and β gives the phase profile that the element should produce. An example of a circular flat-top beam is shown in FIG. 6(b) for the case of , β=8.

As previously mentioned, the quality of these solutions depend strongly on the parameter β. For the two solutions given in Eq. (5) and Eq. (6), β is given by $$\beta = \frac{2\sqrt{2\pi} \; r_0 y_0}{f\lambda}, \quad (7)$$

where:

$r_0=1/e^2$ radius of incoming Gaussian beam,
$y_0$=half-width of desired spot size (for example, the radius for a circular or elliptical spot, or half the width of a square or rectangular spot). Generally, a scaling parameter can be used for more complex geometries, e.g., polygonal, annular, etc. For example,. an isosceles triangle can use height as the scaling parameter.

Examples of the dependence on β will be given later.

An interesting property of the configuration in FIG. 1 is that if ø is any even function solution then −ø is also a solution. If the input beam and the output beams are even functions then ø will be an even function. This is easily demonstrated in one dimension and the development is readily extended to two dimensions. In simplest form, the input/output optical fields in FIG. 1 are related by the Fourier transform:

$$G(\omega) = \int f(x) e^{i\phi(x)} e^{-i\omega x} dx, \quad (8)$$

where G(ω) is the output field and $f(x)$ is the input field. In this equation the integrand can be expanded to give $$\begin{aligned} G(\omega) &= \int f(x)[\cos \phi(x) + i \sin \phi(x)][\cos \omega x - i \sin \omega x] dx, \quad (9) \\ &= \int f(x) \cos \phi(x) \cos \omega x \; dx, \\ &= \int f(x) \cos[-\phi(x)] \cos \omega x \; dx. \end{aligned}$$

The equivalence of the positive and negative solutions follows from the fact that the odd terms in the integrand integrate to zero and the cosine function is an even function. This result has practical implications for system design. The positive solution produces a beam that converges to a small diameter after the output plane, and the negative solution gives a beam that converges to a small diameter before the output plane.

The solutions described above assume that the input beam 5 has a uniform or constant phase at the phase element 10. For a Gaussian beam, the phase is uniform at the beam waist, indicated at w. However, it is not convenient to always locate the beam waist at the shaping element 10. One solution is to build a phase conjugate to the input beam phase into the phase element 10. A more practicable solution is to exploit the fact that the Gaussian beam phase causes a shift in the location of the output plane 14, and, thus, the working distance. That is, the desired profile is located a distance from the focal plane of the transform lens 12. There is also a slight magnification associated with the shift of the output plane. These assertions can be proved using the Fresnel integral and the general form for Gaussian beams.

Gaussian beams propagate with a phase function given by $$f(x,y) = e^{(-\sigma + i\gamma)(x^2 + y^2)}, \quad (10)$$

where σ and γ are functions of the distance from the beam waist, and γ=0 at the beam waist. The previous solutions assumed that γ=0 and the output is the Fourier transform of the product of a Gaussian and the beam shaping phase function of the phase element 10 given by $$U(x_f, y_f) = A e^{i\frac{k}{2f}(x_f^2 + y_f^2)} \int\int e^{-\sigma(x^2+y^2)} e^{i\phi} e^{\frac{i2\pi}{\lambda f}(xx_f + yy_f)} dx dy, \quad (11)$$

where x,y input coordinates and $x_f, y_f$ are output coordinates in the focal plane of the transform lens. An equivalent expression can be obtained by applying the Fresnel integral to the field after the lens. If the lens function is given by $$t_1(x,y) = e^{\frac{-ik}{2f}(x^2+y^2)}, \quad (12)$$

the Fresnel integral gives $$U(x_o,y_o) = \frac{e^{ikz}}{i\lambda z} e^{\frac{ik}{2z}(x_o^2+y_o^2)} \iint e^{(-\sigma+i\gamma)(x^2+y^2)} e^{i\psi} e^{\left(\frac{ik}{2z}-\frac{ik}{2f}\right)(x^2+y^2)} e^{\frac{-ik}{z}(xx_o+yy_o)} dxdy, \quad (13)$$

where $x_0$, $y_0$ are coordinates in a plane a distance z from the transform lens, and z is the shift in the location of the output plane or working distance noted above. If $z=z_0$ is the solution to $$\gamma - \frac{k}{2f} + \frac{k}{2z} = 0, \quad (14)$$

then Eq. (13) reduces to $$U(x_o,y_o) = \frac{e_o^{ikz}}{i\lambda z_o} e^{\frac{ik}{2z_o}(x_o^2+y_o^2)} \iint e^{-\sigma(x^2+y^2)} e^{i\psi} e^{\frac{ik}{z_o}(xx_o+yy_o)} dxdy. \quad (15)$$

The integral in Eq. (15) is a scaled version of that in Eq. (11). Since phase factors do not effect the irradiance pattern, both equations produce the same intensity pattern except for scaling and amplitude factors.

Design Considerations

A primary design advantage of the lossless beam shaping of the present invention is that the designer can start with a desired target spot quality and determine the optical system required, rather than designing multiple optical systems in the hope of producing an acceptable output, without the ability to assess and/or improve system quality. The present invention allows such assessment and control due to recognition that the dimensionless quantity β of Eq. (7) completely determines the quality of the target spot 6 at the target plane 14. In other words, different optical configurations and wavelengths will produce the same target spot quality if they share the same value of β. Low values of β produce target spots with more rounded sides and wider skirt regions, while higher values of β more closely approach the geometric ideal of a uniform intensity profile with infinitely steep sides.

As Eq. (7) implies, the cost of increasing β involves either increasing the size of the Gaussian beam 5 at the phase element 10, enlarging the target spot 6 on the target plane 14, shortening the focal length of the transform lens 12, or reducing the wavelength of the Gaussian beam 5. By considering the application and consulting plots of target quality versus β, the designer can determine the minimum β that will satisfy the needs, and design the most economical system. For most design situations, the size of the target spot 6 at the target plane 14 and the wavelength of the input beam 5 will be determined by the application. The focal length of the transform lens 12 can also be determined by standoff or other considerations, although a minimum focal length will maximize β. The final variable is the radius of the Gaussian beam 5 at the shaping element 10.

Figure 3:
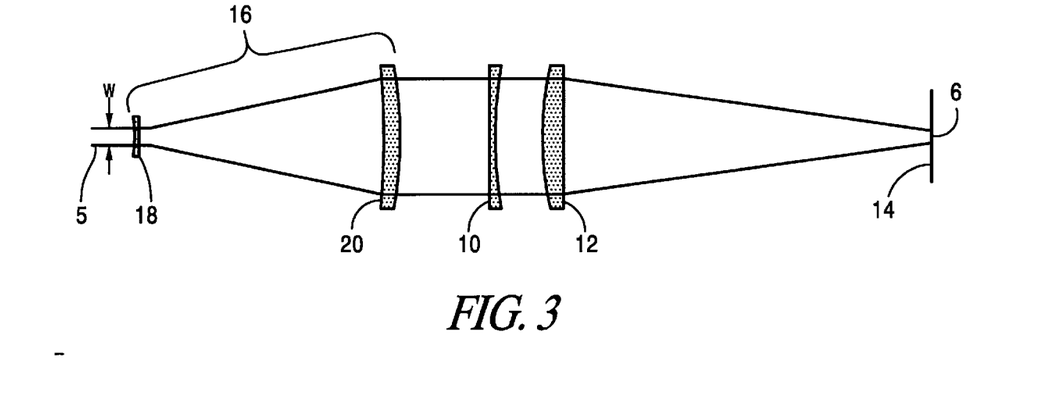
FIG. 3 is a system optical layout of the present invention.

FIG. 3 shows a standard layout for a beam shaping optical system of the present invention which allows for control of the radius of the beam 5. To achieve the desired β, the radius of the beam 5 should be expanded by an afocal telescope 16, as shown in FIG. 3. The afocal telescope includes a minimum of two lenses, a front lens 18 and a back lens 20. Additional lenses can be used to correct for abberations as required, as known to those of skill in the optical art.

With the optical system designed for one target geometry, there are two methods to produce additional target geometries. The first is to change the phase element 10. With the same expansion optics 16 and focusing optics 12, the system could thus produce circular and rectangular beams of several sizes. It should be noted, however, that different target geometries will vary β, and hence spot quality, as determined by Eq. (7).

The second method involves changing the focusing, or transform, lens 12 while leaving the telescope 16 and phase element 10 fixed. This change can vary only the target size, not the geometry, but has the advantage of maintaining a constant target spot quality. The variation in the focal length of the transform lens 12 changes the spot size proportionally, and thus β remains constant.

Once a target spot quality is determined, the required phase profile imparted on the beam 5 by the phase element 10 is determined by multiplying the phase function of Eqs. (5) or (6) by β. This multiplication scales the phase function to the particular geometry of the application. The telescope 16 is then designed to expand the beam 5 to the required value. The transform lens 12 of the required focal length completes the system. The remainder of this section treats the design considerations in more detail, and discusses additional system configurations.

Target spot quality

Since β determines target spot quality independent of the circumstances of the design, graphs of the beam shape versus particular values of β are useful. The following profiles include system effects such as beam truncation and lens aberrations. The profiles were calculated for a $CO_2$ laser system ($\lambda=10.6 \mu m$) with a $f/42$ to $f/21$ plano-convex lens. Aperture radii were truncated at $2r_0$ in these simulations, where $r_0$ was the $1/e^2$ radius of the beam.

Figure 4A:
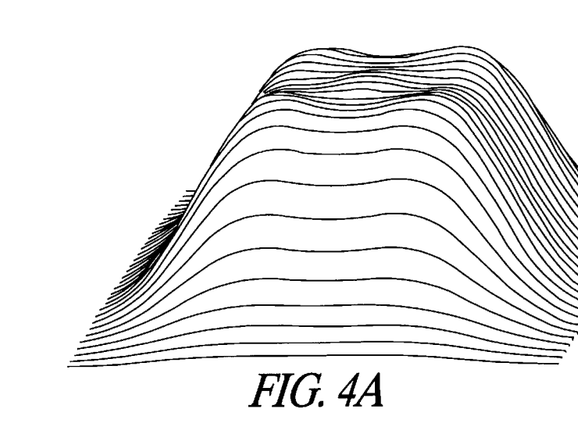
Figure 4B:
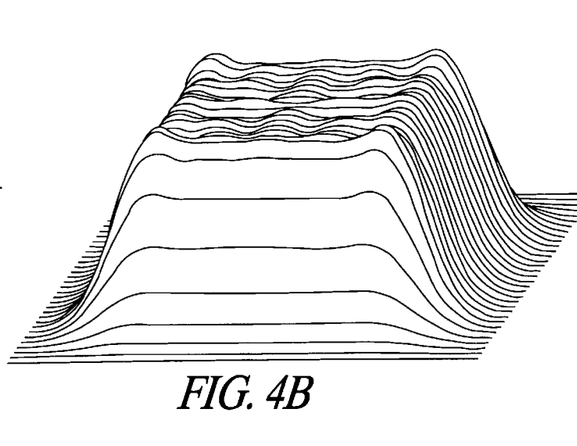
Figure 4C:
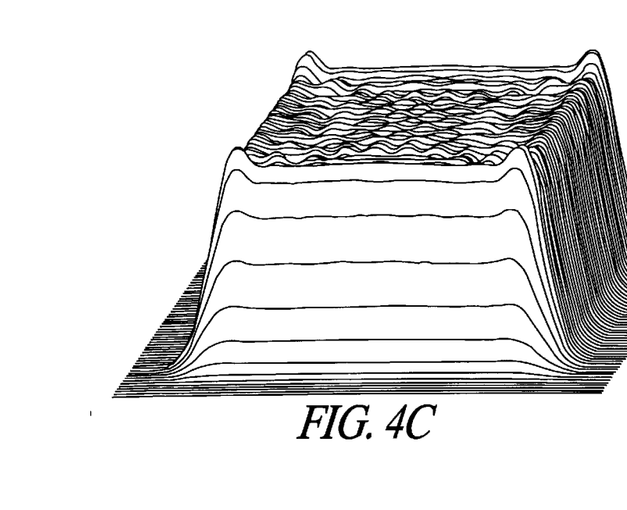

FIG. 4(a) shows a square target spot with β=4. The profile is fairly rounded. FIG. 4(b) shows the square target spot with β=8. The skirts of this spot have narrowed considerably. FIG. 4(c) shows the square target spot with β=16. The skirts of this spot have narrowed further. This system design is beginning to approach the geometric ideal of a uniform profile with infinitely steep sides. The square spot is a special case of the rectangular spot. With a circular input beam 5, a rectangular output can be produced by varying the desired target size along each axis. This would result in a different β for each axis, unless the beam incident upon the phase element is itself anamorphic.

Figure 4D:
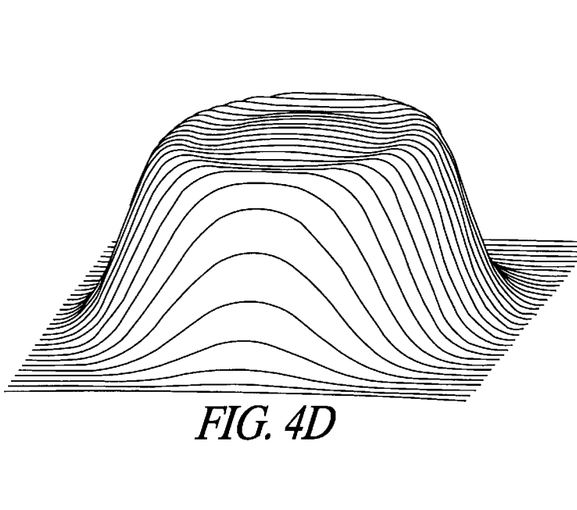
FIG. 4(d) is a round profile, β=8.

For the case of a circular, uniform target spot, FIG. 4(d) illustrates the profile for β=8 and $3r_0$ truncation. This spot behaves similarly to the square case as β changes. Unlike the square case, however, the circular case exhibits noticeable ripple on the profile as the beam is truncated to $2r_0$.

System Evaluation

As shown in FIG. 3, the optical system includes the phase element 10 and three lenses, two forming the telescope 16 and the transform lens 14. Each of these elements can contribute aberrations to the target spot. A complete way to assess system performance is thus desirable. Several optical design packages, e.g., OSLO SIX, now offer the ability to input surfaces with general aspheric profiles as polynomial functions of x and y coordinates. For small values of β, the phase profile can be well approximated by varying the thickness of the phase element 10. In other words, the phase element 10 acts as a "thin" element for small values of β. Some packages allow polynomial phase profiles to be input directly. These packages can be utilized on any appropriate computing system.

In either case, the phase functions are fit to a polynomial with appropriate mathematical software, the polynomial multiplied by $\beta$, and the phase element 10 inserted into the design package along with the other elements. After tracing a spot diagram with Gaussian apodization of the ray weights, the package then calculates a diffraction-based point spread function for the system, which uses the ray map in the exit pupil. The point spread function provides the diffraction response of the system for a point object. A distant point object produces a planar input wavefront characteristic of a Gaussian beam at its waist. Curvature in the input beam wavefront can be modeled by moving the object point to the appropriate distance. Wavelength variations in the input beam can be modeled with a polychromatic spot diagram and point spread function.

A sufficiently robust design package can model effects due to lens aberrations, beam truncation by optics, beam curvature, and alignment and scaling errors. To avoid aliasing in the point spread function, the spot diagram must sufficiently sample the exit pupil. For $\beta$'s on the order of 16 or less, the phase profile varies fairly slowly, and most programs can sample it sufficiently. As $\beta$ increases, however, the phase profile varies more rapidly, and sampling becomes more problematic. However, it should be remembered that $\beta$ is a measure of how well the system approaches the geometric ideal. For high values of $\beta$, therefore, the weighted geometric spot diagram sufficiently models the system performance.

Thus, in addition to being used to design a phase element, the parameter $\beta$ can also be used to evaluate system performance. Once a system has been designed, the variables needed for the determination of $\beta$ are quantifiable. Effects of altering these parameters, either alone or in combination, on system quality can be easily examined. By simply comparing values of $\beta$ for different systems, the relative quality thereof can be assessed, i.e., the larger the value of $\beta$, the higher the system quality. This assessment can also be used to determine if a system is of sufficient quality for a desired application.

Telescope Design

As noted above, displacement of the input Gaussian beam waist from the phase element 10 produces a shift in the location of the output plane 14 and a change in scale of the target spot 6. The telescope 16 can be adjusted to shift the target plane 14 to a different location. The telescope 16 can also compensate for curvature in the input Gaussian beam 5 by adjusting the telescope to place a waist of the beam 5 at the phase element 10, with a corresponding slight change in input beam size. Both adjustments should generally result in negligible effects on $\beta$ and target spot geometry.

In some situations, it may be necessary to compensate for tolerances in the incoming laser beam diameter. The phase element 10 can be located either before or after the transform element 12. Locating the phase element after the transform element 12 allows simple adjustment of position of the phase element 10 in the converging beam until the beam size matches a desired beam sizes. The phase element 10 can then be located behind the transform element 12 and moved along the beam axis until the beam size matches the design size. This movement will scale the target spot size, but $\beta$ will remain constant.

Figure 5A:
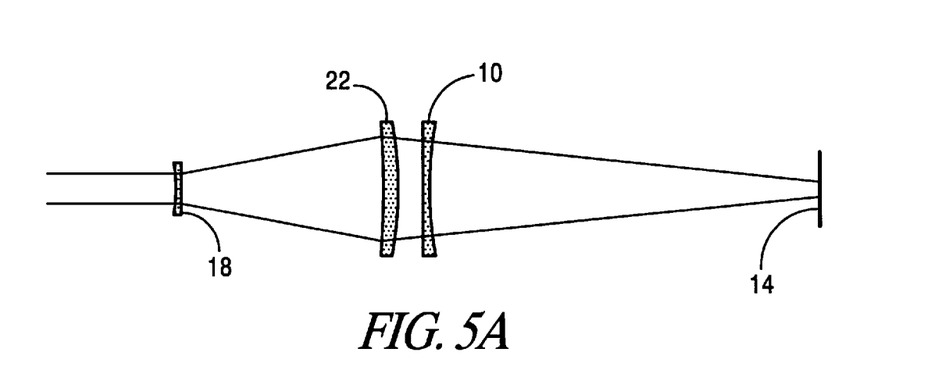
FIG. 5(a) illustrates combined expansion and transform functions in the telescope.
Figure 5B:
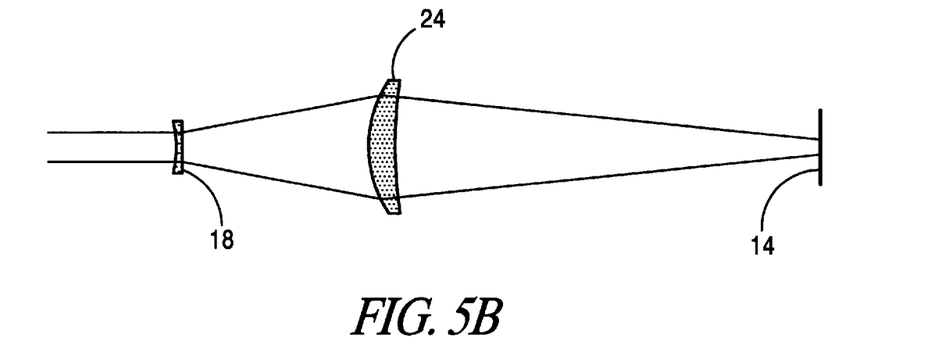
FIG. 5(b) illustrates combined expansion, transform and shaping functions in the telescope.

This placement allows the functions of the elements to be combined in any desirable number of elements. For example, transform lens can be integral with the telescope 16, as shown in FIG. 5(*a*), in which the transform lens 12 separate from the telescope 16 is no longer required. Instead, a dual integral element 22 functions as both the second telescope lens 18 and the transform lens 12 of FIG. 3. Further, as shown in FIG. 5(*b*), the number of elements can be even further reduced by using a triple integral element 24, which functions as the second telescope lens 18, the phase element 10 and the transform element 12. Ultimately, all of the functions can be integrated into a single element.

Aperture Effects

The truncation of the input Gaussian beam by the circular apertures of the elements in the beam shaping system will also affect the target profiles. For a square spot, no noticeable degradation is seen for truncation down to $2r_0$. As aperture sizes decrease, however, further ripple becomes apparent. FIG. 6(*a*) illustrates the effects of $1.5r_0$ truncation on the square spot with $\beta=8$. For the circular spot, ripple becomes apparent at $2r_0$ truncation, as is shown in FIG. 6(*b*), also with $\beta=8$. For the circular spot, the edge-wave disturbances created by the aperture are symmetric through the system and interfere constructively at the target. For the square spot, however, the disturbances created by a circular aperture are altered by the phase element 10 in a non-symmetric fashion, and thus do not all constructively interfere.

Thus, for example, a $2r_0$ circular aperture will affect a circular spot more than the square spot for the same $\beta$. This situation is related to diffraction by circular versus other apertures. For designs producing square or rectangular spots, system apertures of twice the Gaussian beam radius should provide good performance. For designs producing circular spots, system apertures of three times the Gaussian beam radius will be necessary to avoid ripple effects.

Positive and negative phase functions

Figure 7A:
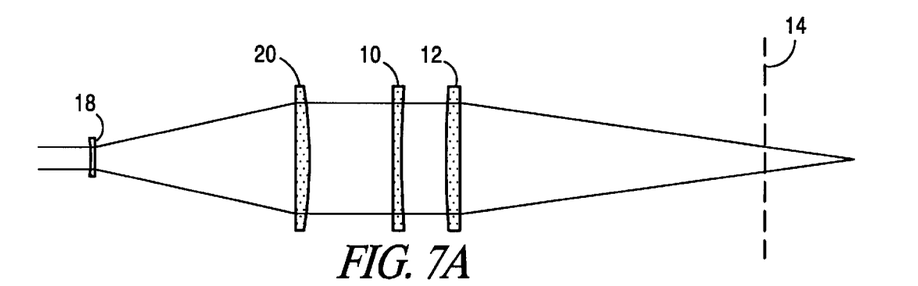
Figure 7B:
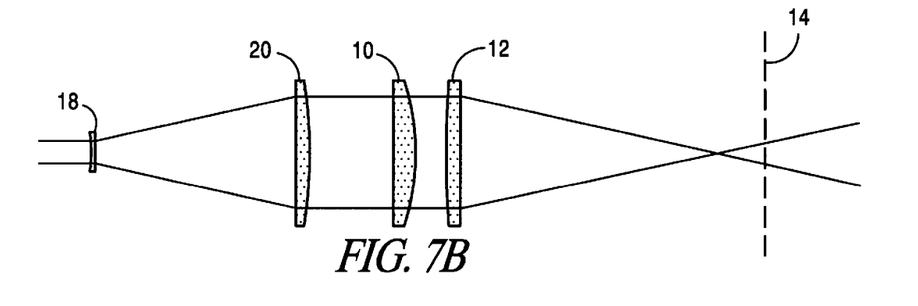
FIG. 7(b) shows an element with negative phase function acts geometrically as an aberrated positive lens; in both 7(a) and 7(b), the target plane is the focal plane of the final lens.

As noted above, the phase function has two solutions, positive and negative, for a given configuration. With reference to Eq. (1), ø is the phase delay suffered by a wave in passing through the phase element 10. This situation is analogous to the phase delays introduced by thin lenses. For a positive phase function ø, Eq. (5) and Eq. (6) show that the phase delay will vary from zero at the optical axis to increasingly positive values away from the axis. This situation is the same as that for a negative thin lens, and additional insight into the beam shaping system can be gained by viewing the shaping element geometrically, as is illustrated in FIGS. 7(*a*) and 7(*b*).

The target plane 14 is the focal plane of the transform, or focusing, element 12 and this is where the desired target spot appears. For an element with a positive phase function shown in FIG. 7(*a*), the beam continues to decrease in size after the target plane. Geometrically, the element has reduced the power of the optical system and behaves much as an aberrated negative lens. For an element with a negative phase function shown in FIG. 7(*b*), the beam passes through a minimum diameter before reaching the target plane. The element thus geometrically behaves as an aberrated positive lens.

In both cases, the spot at the target plane will be identical. The positive phase function (a) has an advantage in depth of field, since the wavefront through the system is closer to planar than for the negative phase function (b). An analogous geometric explanation is that the marginal rays for (a) have smaller angles than (b), thus allowing a larger depth of field. Defocus of the target plane leads to deviations in spot uniformity, and it is treated in the next section. Particular applications may demand that the minimum beam size occur either before or after the target plane. If there is a choice, however, the positive phase function features the least sensitivity to defocus errors.

Alignment and Scaling Errors

Figure 9:
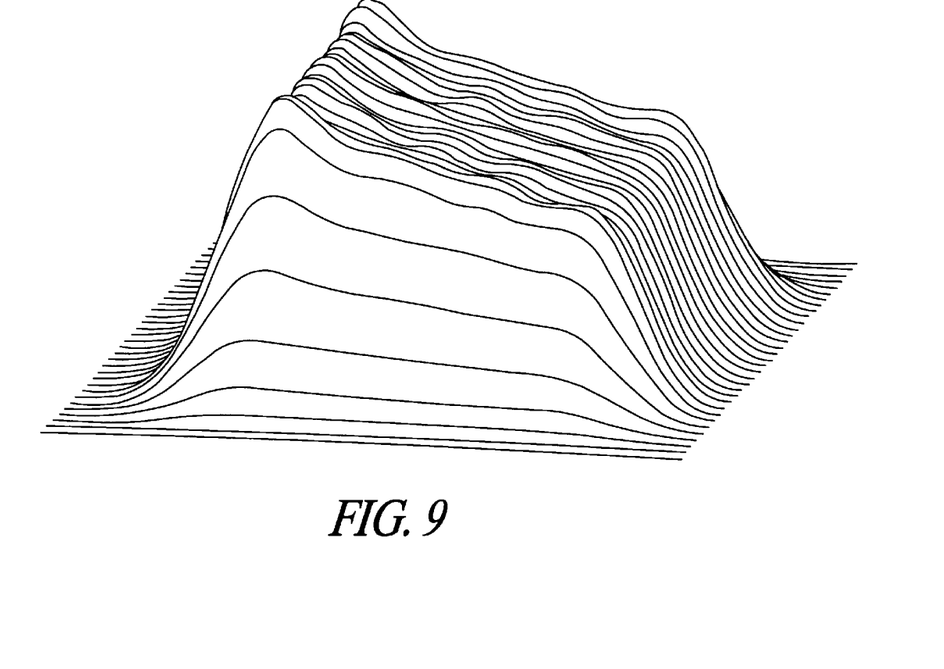
FIG. 9 illustrates the effect when an input beam is decentered along element axis by 0.1$r_0$, β=8 case.

Unlike methods based on multifaceted integrators, the lossless beam shaping of the present invention is sensitive to alignment errors and variations in the input beam size. FIG. 9 shows the effect of decentering the Gaussian beam on the phase element 10 by $0.1r_0$ along one of the element axes. For other elements in the system, decentration is most important where it would result in moving the beam on the phase element 10. For example, decentration of the negative lens in FIG. 3 would decenter the beam on the phase element 10 and thus produce the effects shown in FIG. 9. On the other hand, decentration of the transform element 12 would have a relatively small impact on the target spot quality. Spot quality is also fairly insensitive to tilt of the phase element 10, which acts much as a thin plate in this case.

Figure 10A:
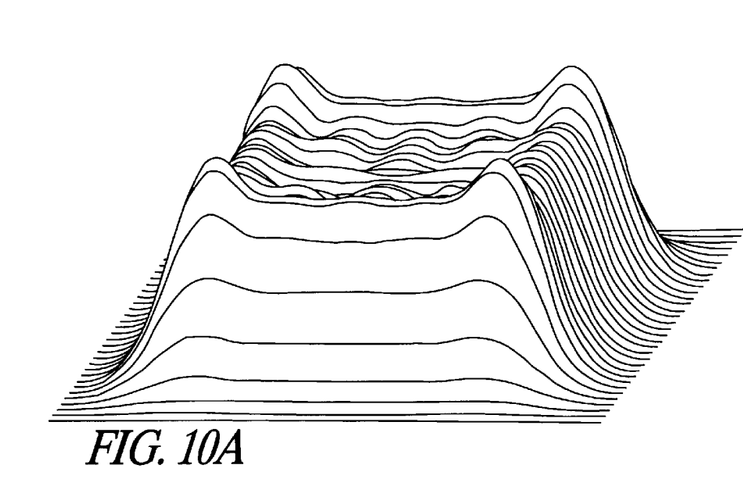
FIG. 10(a) illustrate effects of an input beam 10% larger than design size.
Figure 10B:
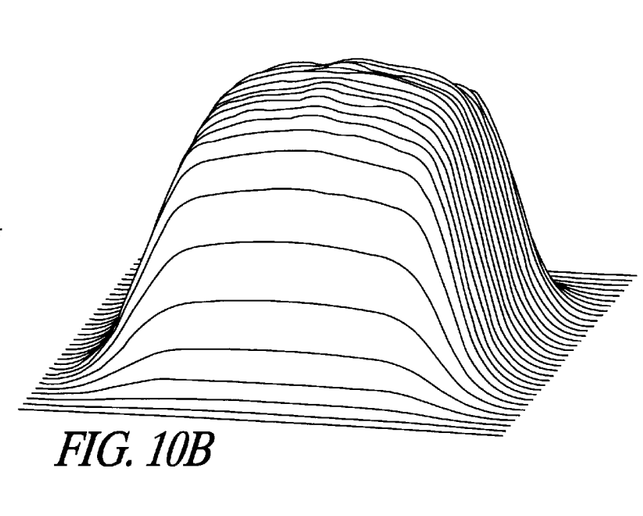
FIG. 10(b); illustrate effects of an input beam 10% smaller than design size.

Since the shaping element 10 is designed for a particular input beam size, which in part determines the scaling factor $\beta$, deviations of the beam 5 from the design input beam size will affect the target spot. The following cases show the degradation in the square target spot for the $\beta=8$ design of FIG. 4(b), with a positive phase function. In FIG. 10(a), the input Gaussian beam size is 10% larger than the size used in the design. The target spot shows significantly raised edges. FIG. 10(b) shows the target spot for an input beam size that is 10% smaller than that used in the design. The edges of the spot have rounded off. For many applications, this rounding effect is less detrimental than that caused by the raised edges. Thus, if variation in the input beam size is anticipated for systems with a positive phase function, the element should be designed for a beam somewhere near the upper limit of the size range.

Target plane defocus also affects the quality of the target spot for the following reasons. The beam shaping system uses a lens 12 to transform the input beam 5 plus the phase function of the phase element 10 to the desired shape. The output spot on target plane 14 exists at the transform plane of the lens, which is also its focal point. In the derivation of the phase element 10, the problem was to minimize the difference between the desired and the actual irradiance at the target plane 14. There were no constraints on the phase of the beam 5 at the target plane 14 or on the beam irradiance outside the transform plane. Since the phase is generally not uniform at the target plane 14, the shaped beam will not display the symmetry about the target plane characteristic of the waist of a Gaussian beam. The irradiance of the beam will thus deviate from the desired shape when the target plane 14 is moved away from the focal point of the transform lens 12.

Figure 11A:
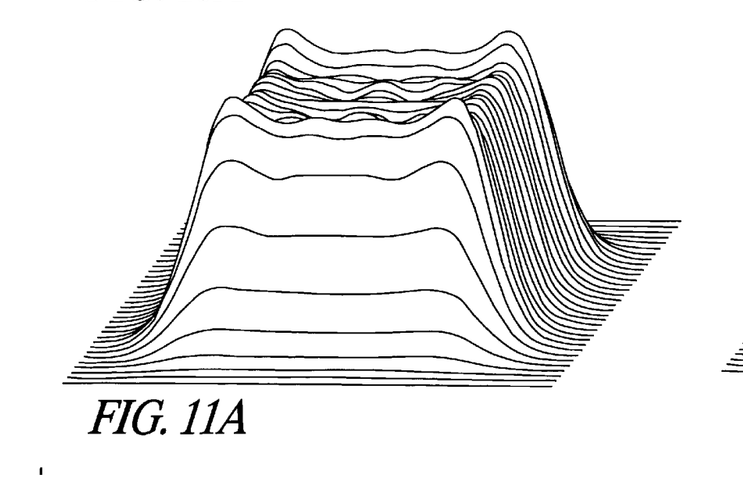
FIG. 11(a) illustrate defocus effects in a target plane defocused by+f/50.
Figure 11B:
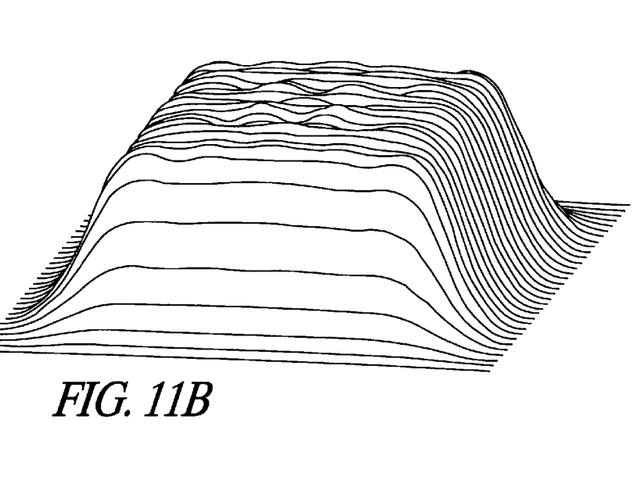
FIG. 11(b) illustrate defocus effects in a target plane defocused by−f/50.

The following cases apply to the $\beta=8$ design of FIG. 4(b), with a positive phase function. FIG. 11(a) shows the effect of moving the target plane away from the transform lens by $f/50$, where $f$ is the focal length of the lens 12. The spot decreases in size, increases in average irradiance, and the edge areas rise relative to the center. FIG. 11(b) shows the effect of moving the target plane 14 towards the transform lens 12 by $f/50$. Here the spot increases in size and decreases in average irradiance. The spot uniformity remains fairly good, however. Thus, if defocus is anticipated in systems with a positive phase function, the system should be designed for the upper part of the focus range.

Figure 8A:
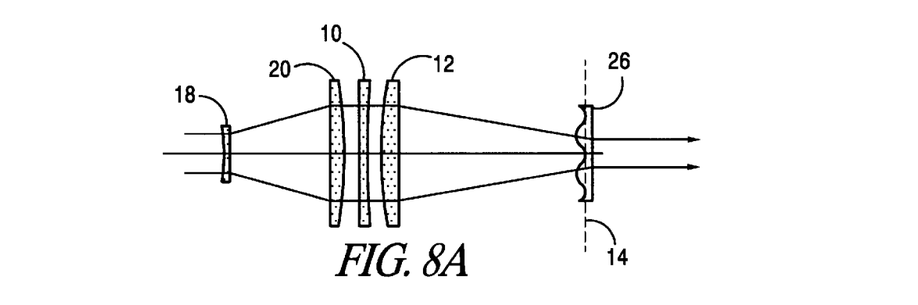
FIG. 8(a) illustrates the system with a telescope and a phase plate.
Figure 8B:
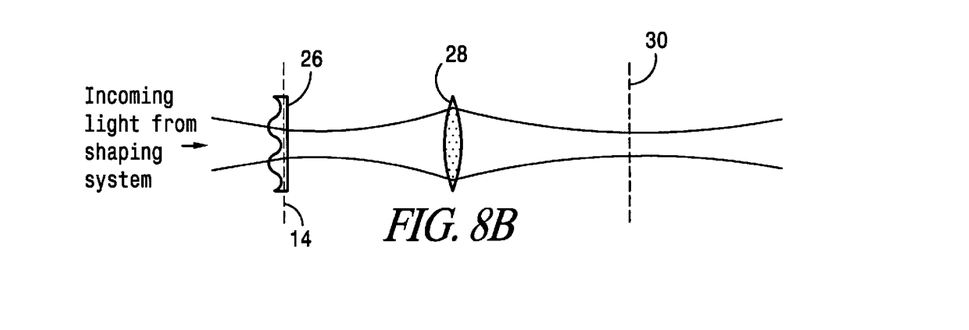
FIG. 8(b) illustrates a relay lens delivering a beam output by the phase plate in FIG. 8(a) to a relay target plane.

As noted, the beam's phase at the target plane 14 is unconstrained. Thus, in the system illustrated in FIG. 3, the target spot cannot simply be collimated with a negative lens to propagate as a flat-top beam. The phase at the target, however, can be computed. A conjugate phase plate placed at the target would cancel these phase differences, and the uniform profile would propagate as a collimated beam, subject to diffraction. Such a configuration is shown in FIG. 8(a) in which a phase plate 26 is placed in the target plane 14. The depth of focus can be increased by providing both a converging and diverging beam around the target plane. Such a configuration is shown in FIG. 8(b), in which a relay lens 28 compensates for the resultant diffraction spreading of the target spot 6 on the phase plate 26. The relay lens 28 then provides the target spot at a relayed target plane 30. The relayed beam is symmetric about the relayed target plane 30, so there is a longer distance where the beam maintains the desired tangential dimensions. Thus, the depth of field is extended. If the target spot 6 is simply desired at another location or scale, the target spot can be re-imaged with the relay lens, without the use of the phase plate 26.

Method of Design

As stated before, the quality of the target spot can be selected to suit the application, and the necessary optical system parameters calculated directly. In most cases, the size of the Gaussian beam at the phase element 10 will be the free variable that determines $\beta$. If the phase element 10 and the optical system are to be studied with an optical design program, the phase function will need to be expressed as a polynomial. With the optical design program, the response of the system to tolerances in beam scaling, beam position, element position, element tilt, and target defocus can be studied. Beam truncation effects can also be modeled if necessary. If tolerances in input beam size or target position are expected in systems with a positive phase function, the target spot will degrade most gracefully if the element is designed for a slightly larger beam than expected with a target plane slightly further away than expected.

In order to facilitate modeling, the phase functions for rectangular and circular spots have been fitted to 10th-order polynomials. The fits are good to $\xi=3\sqrt{2}$, which is $3r_0$ at the phase element. The form for the rectangular and circular cross section is $$\phi(\xi)=a_2\xi^2+a_4\xi^4+a_6\xi^6+a_8\xi^8+a_{10}\xi^{10}, \qquad (16)$$

where

| Rectangular spot | Circular spot |
|---|---|
| $a_2 = 4.73974 \cdot 10^{-1}$ | $a_2 = 4.31128 \cdot 10^{-1}$ |
| $a_4 = -5.50034 \cdot 10^{-2}$ | $a_4 = -4.36550 \cdot 10^{-2}$ |
| $a_6 = 4.99298 \cdot 10^{-3}$ | $a_6 = 3.65204 \cdot 10^{-3}$ |
| $a_8 = -2.37191 \cdot 10^{-4}$ | $a_8 = -1.65025 \cdot 10^{-4}$ |
| $a_{10} = 4.41478 \cdot 10^{-6}$ | $a_{10} = 2.97368 \cdot 10^{-6}$ |

Figure 12A:
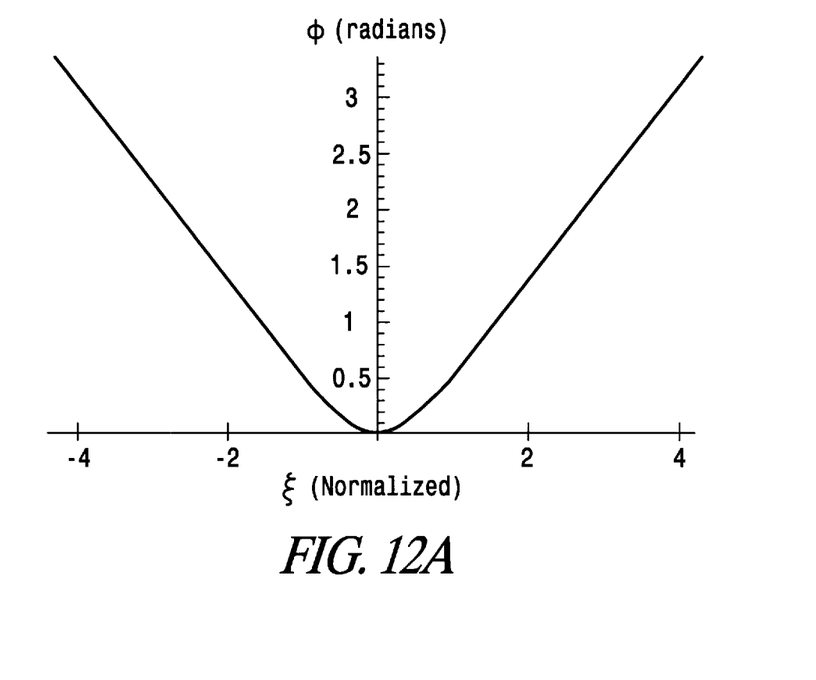
FIG. 12(a) shows a rectangular phase function and 10th-order fit.
Figure 12B:
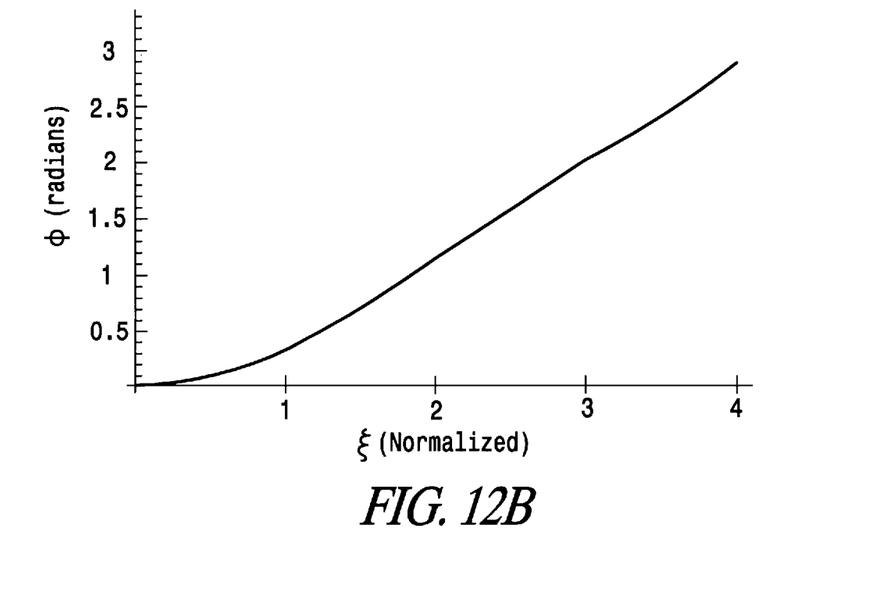
FIG. 12(b) shows a circular phase function and 10th-order fit.

For the rectangular spot, FIG. 12(a) shows the quality of fit to the original function. The two curves follow each other closely, with an RMS variation of 0.0046 radians. As discussed before, the phase function for each axis is multiplied by $\beta$ to scale it to the desired geometry, and the dimensionless quantities $\xi$ are replaced by actual coordinates according to Eq. (5). The scaled phase functions for each axis are then summed to define the complete phase function. For the circular spot, FIG. 12(b) shows the quality of fit. The RMS variation between the two curves is 0.0025 radians. $\xi$ is a radial coordinate in this case, and the phase function is radially symmetric.

Practical Example

The following example illustrates the use of the technique to solve an actual problem. Consider the case where a rectangular spot is desired 400 mm away from an optical system. The target spot dimensions are 2 mm (x axis) by 4 mm (y axis). A 10.6 $\mu$m laser produces a Gaussian beam with a $1/e^2$ radius of 3 mm, and the optical train is composed of ZnSe (n=2.403). A system layout as shown in FIG. 3 is used, with an $f$=400 mm focusing lens and a $\beta$=8 as a minimum acceptable value. From Eq. (7), we see that the beam radius at the phase element, $r_0$, is the only unconstrained variable. Also, the x axis will require the most expansion to produce the required $\beta$, since its target dimension is smaller. For $\beta_x$=8, we obtain $r_0$=6.76 mmn at the phase element, for an expansion ratio of 2.25 from the telescope. The beam could have been anamorphically expanded to produce the same $\beta$ for the y axis, but here a standard radially symmetric telescope for $\beta_y$=16 was used.

The phase profile was generated by varying the thickness of the phase element. A polynomial that yields the phase element sagitta, or deviations from a plane at the surface vertex and the surface, as a function of distances from the optic axis is needed. This can be obtained by multiplying the coefficients of Eq. (16) by $\beta_x$ or $\beta_y$ and converting them to produce sagitta as a function of element coordinates. The following equation gives the sagitta of the phase surface:

$$Sag(x,y) = m_2 x^2 + n_2 y^2 + m_4 x^4 + n_4 y^4 + m_6 x^6 + \quad (17)$$
$$n_6 y^6 + m_8 x^8 + n_8 y^8 + m_{10} x^{10} + n_{10} y^{10},$$

where $$m_i = \frac{a_i \lambda \beta_x \left(\frac{\sqrt{2}}{r_0}\right)^i}{2\pi(n-1)} \text{ and } n_i = \frac{a_i \lambda \beta_y \left(\frac{\sqrt{2}}{r_0}\right)^i}{2\pi(n-1)}. \quad (18)$$

The first four coefficients in this polynomial would be $m_2$=1.99·10$^{-4}$, $n_2$=3.98·10$^{-4}$, $m_4$=−1.01·10$^{-6}$, and $n_4$=−2.02·10$^{-6}$. If an element with a positive phase function was desired, the sign convention on the sagitta would be such that the phase surface had a concave shape.

Figure 13:
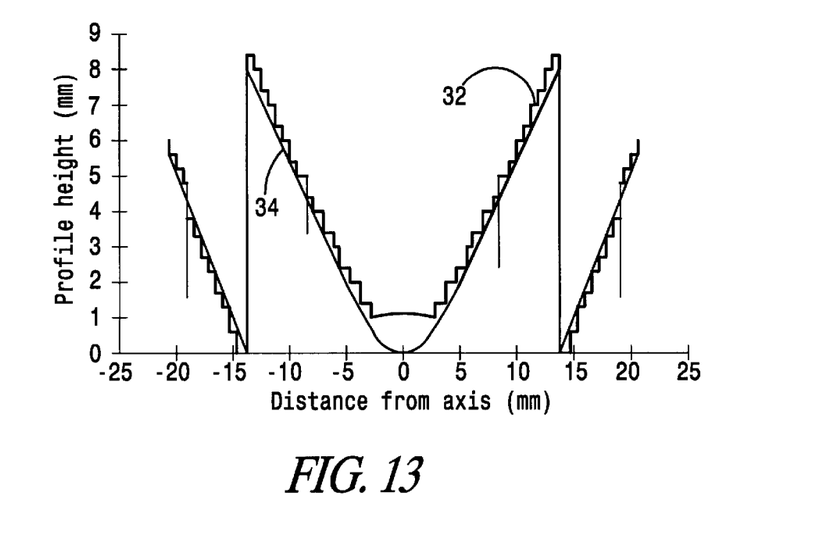
FIG. 13 plots a measured profile of shaping element along x axis and a 16-level diffractive approximation to the desired profile shown by the smooth curve.

A beam shaping system was developed for an application that required a long working distance, limited beam sizes, and operation at 10.6 $\mu$m. This resulted in a maximum target spot quality given by $\beta$=4.8. The phase element was fabricated in ZnSe as a 16-level diffractive optic. FIG. 13 shows the element profile 32 along the x axis as measured by a stylus profilometer. The desired profile in terms of element thickness is shown by the smooth curve overlaid on the measured profile 34. In order to match the 2$\pi$ phase shifts of the diffractive optic, 2$\pi$ phase shifts (or thickness shifts of $\lambda$/(n−1)) were applied to the graph of desired profile as well. Overall, the measured element profile 32 was in reasonable agreement with the desired profile 34, with the exception of a displacement near the center of the element.

The phase element was tested on a different laser than that for which it was designed, although the measured beam dimensions were within the design goals. The laser beam passed through the beam shaping optical system and onto a target plane. A lens beyond the target plane re-imaged and magnified the target spot onto a pyroelectric array camera. The focus and magnification of the re-imaging system were set by placing a calibrated pinhole at the target plane and adjusting the lens for a sharp image on the camera. The laser beam dimensions at the input of the optical system were determined with orthogonal scanning knife-edges in conjunction with an automated focusing system. This device computed the internal beam waist size and location as well as the beam divergence. It then computed the same parameters for the external laser beam. These quantities then determined the initial beam size at the telescope system. Thus, calibration of the system can be realized.

Before presenting the experimental results, it is instructive to see the predicted spot geometry for the actual beam input parameters. The system was modeled using the computed beam radii for the x and y axes at the first telescope lens. There was a difference of roughly 5% in the computed radius of curvature for the x and y axes, but this was ignored in the modeling.

Figure 14:
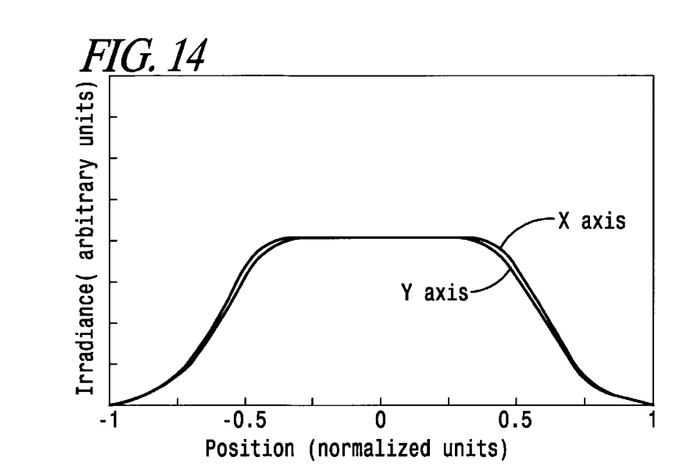
FIG. 14 shows predicted target spot profiles using the measured beam radii at the input of the optical system with normalized units.

In FIG. 14, predicted target spot profiles for the x and y axes are shown, scaled to normalized position units. The optical system was initially aligned using a visible reference beam. Final alignment of the beam shaping element was accomplished by viewing the target image with the pyroelectric array camera.

Figure 15:
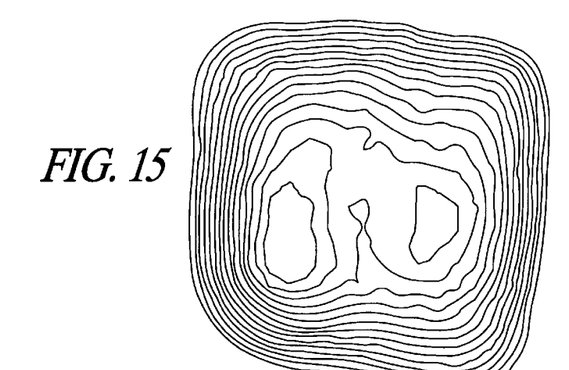
FIG. 15 is a contour plot of the target spot for a β=4.8 system in which the contours have equal intervals of 3.2% of the maximum value.
Figure 16A:
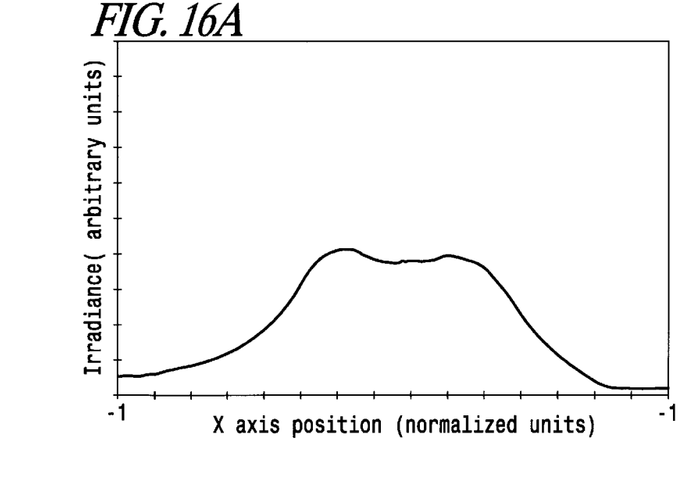
FIG. 16(a) plots irradiance versus the X position along the target spot.
Figure 16B:
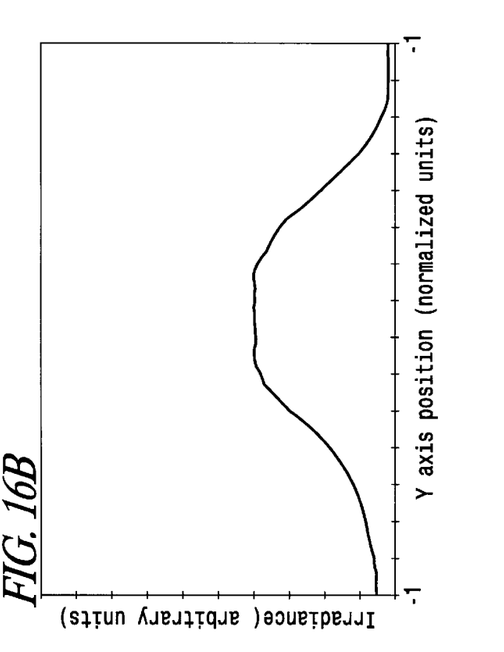
FIG. 16(b) plots irradiance versus the Y position along the target spot.

FIG. 15 shows a contour plot of the target spot when the system is aligned. The square appearance is evident. Profiles of this image were extracted and are plotted in FIGS. 16(a) and 16(b). These profiles use the same normalized position units as the predicted profiles of FIG. 14. The measured profiles are smaller than predicted, and they deviate somewhat from the desired uniform irradiance. Nevertheless, the measured profiles show a general agreement with the predicted uniform profiles.

The size difference is partly a function of difficulties in establishing the best target plane. Distance measurements from the transform lens were somewhat inexact, and compensation was necessary for the curvature of the input beam. Also, the re-imaging lens and the camera were mounted independently, so that it was difficult to move the target plane once re-imaging focus was set. Most likely, the re-imaging magnification and focus varied during the alignment process. These uncertainties, coupled with alignment issues for the shaping element, made for difficulties with several independent adjustments during system alignment. Alternatively, the camera, re-imaging lens, and pinhole could be mounted together on a common structure, with the pinhole mounted kinematically.

When the camera system was used to find the best target plane, the pinhole could be replaced to mark it exactly. Also, a good approximation to the target plane position could be found by removing the shaping element from the system. The focused beam waist would occur very close to the system focal point, and would account for curvature in the input beam. Telescope separation could be adjusted to put the target plane at the desired location, with fewer subsequent adjustments to make during alignment.

Differences in the measured profile uniformity are at least partly the result of two factors. First, the test laser displayed near-field deviations from a Gaussian shape due to its unstable resonator configuration. These near-field deviations tend to be masked in far-field beam measurements due to diffraction effects from the focusing lens. Second, the measured element profile shown in FIG. 13 differed somewhat from the desired profile, leading to a difference in the phase delay applied to the beam.

To design the beam shaping element, $\beta$ is determined from Eq. (7). The user will know the desired spot size and wavelength for a particular application, and will then choose an incoming beam size and focal length that gives the $\beta$, and thus the profile quality, desired. The following phase function $\phi(z)$ is then multiplied by $\beta$ to find the phase profile that the element should impart on the beam ($\beta\phi(z)$). An optical shop can take this phase profile and build the element.

Clearly, once the normalized phase function of any desired spot is known, the resulting phase profile imparted by the phase element can be determined by multiplying this phase function by the parameter $\beta$.

Conclusion

By the introduction of appropriate phase delay in conjunction with a transform lens, single-mode Gaussian beams can be transformed into circular or rectangular beams with approximately uniform irradiance profiles. The quality of the target spot depends on a parameter β that is a function of the input beam size, the target spot size, the focal length of the transform lens, and the wavelength. This dimensionless parameter accounts for diffraction effects from the transform lens, independent of the particular system. Use of the β parameter allows the designer to determine the system parameters necessary for a desired target spot quality. Previously, the designer would have to iterate through several designs, with still no certainty as to whether the design was optimal or even physically feasible. In accordance with the present invention once the system parameters are known, the phase function representing the desired shape can be scaled appropriately. The phase delay function can be approximated by a polynomial, which allows standard optics modeling software to predict the effects of system aberrations and tolerances.

The invention being thus described, it will be obvious that the same can be varied in numerous ways. Such variations are not to be regarded as a departure from the spirit and scope of the invention, and all such modifications as would be obvious to one skilled in the art are intended to be included within the scope of the following claims.

What is claimed is:

1. An apparatus comprising:
   a) a shaping element which induces a phase function on an input beam;
   b) a transform element which Fourier transforms the beam having the phase function induced thereon; and
   c) a target plane on which the beam having a desired shape is focused by said transform element, wherein the phase function of said shaping element is a function of a parameter $\beta = cr_0 y_0 / \lambda f$, where
      $r_0$ = the radial distance from the center of the input beam where the intensity of the input beam is $1/e^2$ times the maximum intensity of the input beam,
      $y_0$ = scaling parameter of the desired shape,
      $c$ = a constant,
      $\lambda$ = wavelength of the input beam, and
      $f$ = focal length of said transform element.

2. The apparatus as recited in claim 1, further comprising a telescope, wherein said telescope accepts an initial beam and controls the size of the input beam that impinges on said shaping element.

3. The apparatus as recited in claim 2, wherein said telescope includes said transform element.

4. The apparatus as recited in claim 2, wherein the size of the beam output from said telescope matches an optimum beam size for said shaping element.

5. The apparatus as recited in claim 2, wherein said telescope comprises first and second telescope lenses, and wherein said second telescope lens, said shaping element and said transform element are integral.

6. The apparatus as recited in claim 1, further comprising a phase plate positioned at said target plane, thereby allowing the beam output to have a uniform profile.

7. The apparatus as recited in claim 6, further comprising a relay lens which compensates for the spreading of the beam by diffraction due to propagation of the beam, further extending a depth of field of the apparatus.

8. The apparatus as recited in claim 1, wherein the parameter is defined by the following equation:

$$\beta = \frac{2\sqrt{2\pi} \; r_0 y_0}{f\lambda}.$$

9. The apparatus as recited in claim 8, wherein the parameter $\beta > 3$.

10. An apparatus comprising:
    a) a transform element which Fourier transforms an input beam to produce an intermediate beam;
    b) a shaping element which induces a phase function on said intermediate beam; and
    c) a target plane on which the beam having a desired shape is focused by said transform element in combination with said shaping element, wherein the phase function of said shaping element is a function of a parameter $\beta = cr_0 y_0 / \lambda f$, where
       $r_0$ = the radial distance from the center of the input beam where the intensity of the input beam is $1/e^2$ times the maximum intensity of the input beam,
       $y_0$ = scaling parameter of the desired shape,
       $c$ = a constant,
       $\lambda$ = wavelength of the input beam, and
       $f$ = focal length of said transform element.

11. A method for shaping a Gaussian beam comprising the steps of:
    a) inducing a phase function on an input beam via a shaping element;
    b) Fourier transforming the beam having the phase function induced thereon via a transform element onto a target plane on which the beam has a desired shape; and
    wherein the phase function of the shaping element is a function of a dimensionless parameter $\beta = cr_0 y_0 / \lambda f$, where
       $r_0$ = the radial distance from the center of the input beam where the intensity of the input beam is $1/e^2$ times the maximum intensity of the input beam,
       $y_0$ = scaling parameter of the desired shape,
       $c$ = a constant,
       $\lambda$ = wavelength of the input beam, and
       $f$ = focal length of said transform element.

12. The method as recited in claim 11, wherein said phase function is determined by selection of said focal length and said radius, while said wavelength and said scaling parameter have fixed values dictated by the application.

13. The method as recited in claim 11, further comprising altering said wavelength of the beam and positioning the shaping element in order to maintain the value of the dimensionless parameter β.

14. The method as recited in claim 11, wherein said dimensionless parameter β is defined by the following equation:

$$\beta = \frac{2\sqrt{2\pi} \; r_0 y_0}{f\lambda}$$

15. The method as recited in claim 14, wherein said parameter $\beta > 3$.

16. The method as recited in claim 14, wherein, when the input beam is a circular Gaussian beam and the desired shape is a uniform beam with a rectangular cross-section, wherein the phase function of said shaping element is determined by determining a normalized phase function ϕ(z) for a rectangular spot by:

$$\phi(z) = \frac{\sqrt{\pi}}{2} \cdot z \cdot erf(z) \cdot \frac{1}{2} \cdot \exp(-z^2) - \frac{1}{2}$$

where $$z = \frac{\sqrt{2} \cdot x}{r_0} \text{ or } z = \frac{\sqrt{2} \cdot y}{r_0}$$

where
x=horizontal distance from axis of the shaping element,
y=vertical distance from axis of the shaping element,
$r_0$=the radial distance from the center of the input beam where the intensity of the input beam is $1/e^2$ times the maximum intensity of incoming Gaussian beam, and
$erf(z)$=error function; and
multiplying the phase function by the parameter β determines the phase profile the shaping element imparts to the input beam.

17. The method as recited in claim 14, wherein, when the input beam is a circular Gaussian beam and the desired shape is a uniform beam with a circular cross-section, said selecting step further includes:
determining a normalized phase function ø(z) for a circular spot by:

$$\phi(z) = \frac{\sqrt{\pi}}{2} \cdot \int_0^z \sqrt{1 - \exp(-\rho^2)} \, d\rho$$

where $$z = \frac{\sqrt{2} \cdot r}{r_0}$$

and
r=radial distance from axis of the shaping element, and
$r_0$=the radial distance from the center of the input beam where the intensity of the input beam is $1/e^2$ times the maximum intensity of incoming Gaussian beam; and
multiplying the phase function by the parameter beta determines the phase profile the shaping element imparts to the input beam.

18. The method as recited in claim 11, wherein said desired shape is one of a square, a rectangle, a circle, and an ellipse.

19. The method as recited in claim 11, further comprising changing the focal length of the transform element while maintaining the shaping element in order to alter the size of the desired shape.

20. The method as recited in claim 11, further comprising changing the β value of the shaping element while maintaining the transform element in order to alter system quality.

21. A method for evaluating the quality of a system for shaping a Gaussian beam comprising the steps of:
a) determining a radius of an input beam;
b) determining a half-width of a desired shape;
c) determining a focal length of a Fourier transform element in the system; and
d) computing a parameter $\beta = cr_0 y_0 / \lambda f$, where
c=a constant,
$r_0$=the radial distance from the center of the input beam where the intensity of the input beam is $1/e^2$ times the maximum intensity of the input beam,
$y_0$=scaling parameter of the desired shape,
λ=wavelength of the input beam, and
f=focal length of the transform element;
wherein the greater the value of the parameter β, the better the quality of the system.

22. The method as recited in claim 21, wherein said computing step includes defining the parameter by the following equation:

$$\beta = \frac{2\sqrt{2\pi} \; r_0 y_0}{f \lambda}.$$

23. The method as recited in claim 22, wherein β=3 indicates minimum desirable system quality.

* * * * *